United States Patent [19]

Saur

[11] Patent Number: 4,835,012
[45] Date of Patent: May 30, 1989

[54] PROCESS FOR APPLICATION OF A CURABLE MATERIAL TO AN ARTICLE

[75] Inventor: Wolfgang K. Saur, Männedorf, Switzerland

[73] Assignee: Gurit-Essex AG, Switzerland

[21] Appl. No.: 937,228

[22] Filed: Dec. 3, 1986

[30] Foreign Application Priority Data

Dec. 23, 1985 [DE] Fed. Rep. of Germany ....... 3545899

[51] Int. Cl.$^4$ ............................................. B05I 1/36
[52] U.S. Cl. .................................. 427/266; 427/265; 427/281
[58] Field of Search ............... 427/258, 285, 401, 266, 427/265, 284; 118/410, 411, 412; 525/939

[56] References Cited

U.S. PATENT DOCUMENTS

| | | | |
|---|---|---|---|
| 3,481,306 | 12/1969 | O'Connell et al. | 118/665 |
| 3,951,898 | 4/1976 | Paul | 525/939 |
| 4,064,194 | 12/1977 | Evans et al. | 427/385.5 |
| 4,210,687 | 7/1980 | Obendorf et al. | 427/302 |
| 4,246,148 | 1/1981 | Shimp | 525/939 |
| 4,285,849 | 8/1981 | Dowfeako et al. | 525/939 |
| 4,338,351 | 7/1982 | Bloom et al. | 427/101 |
| 4,409,266 | 10/1983 | Wieczorrak et al. | 427/302 |
| 4,416,917 | 11/1983 | France et al. | 427/302 |
| 4,469,044 | 9/1984 | Bloom et al. | 118/410 |

Primary Examiner—Thurman K. Page
Assistant Examiner—L. R. Horne
Attorney, Agent, or Firm—Pasquale A. Razzano

[57] ABSTRACT

Method and apparatus for applying a curable material having variable curing characteristics to a surface in a defined application cycle which includes the steps of applying only a first slow curing component to the surface of an article at least at the beginning or at the end of an application cycle and applying during the remaining part of the application cycle a mixture of the slow curing component and a curing agent which accelerates the curing of the first component.

6 Claims, 3 Drawing Sheets

FIG. 5
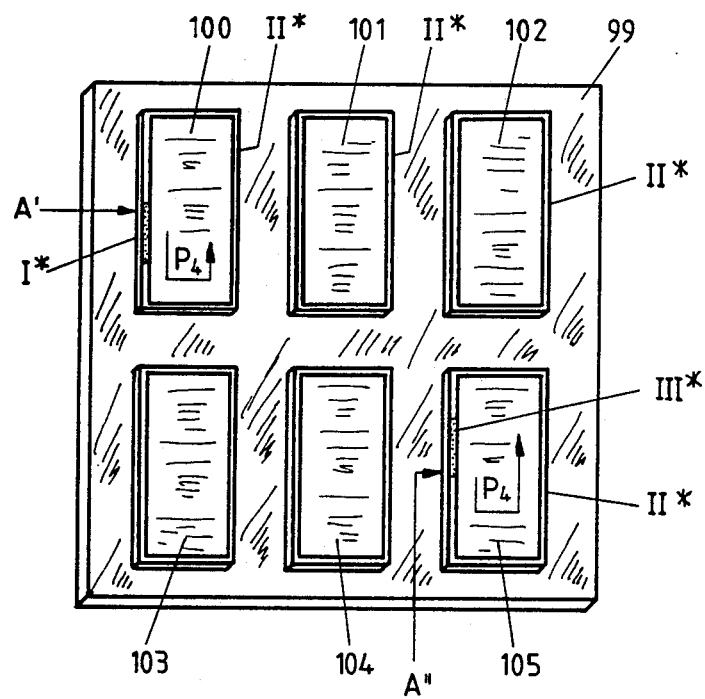
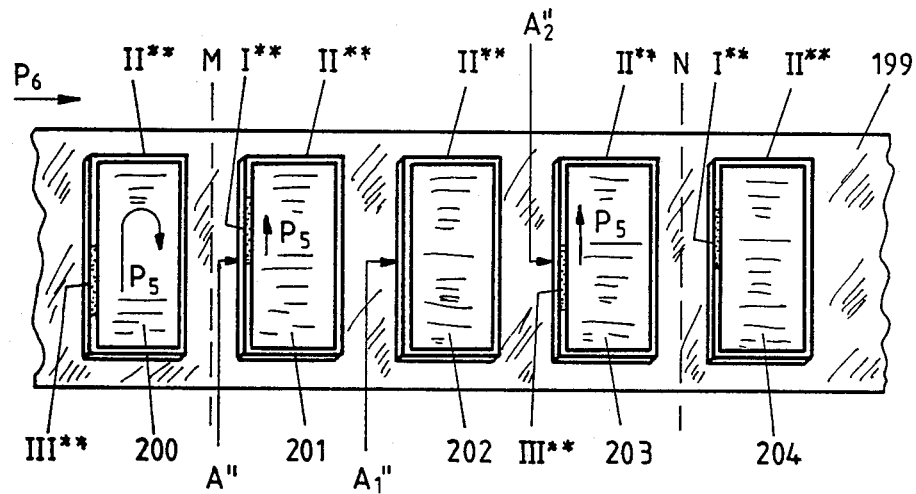
FIG. 6

PROCESS FOR APPLICATION OF A CURABLE MATERIAL TO AN ARTICLE

The present invention relates to a process and a system for applying a quickly curable or hardenable material to an article of arbitary size and shape which, having been coated with the material, is typically advanced to another operation. For example, a continuous ribbon or a row of beads of an adhesive or sealant is applied to the periphery of a window or glass plate which is then fitted into a frame for it, and adhesively as well as sealingly secured therein. Particularly, this invention relates to a process and a system for applying a material which comprises at least two components, at least one of the components thereof being self-curable as will be further explained hereinafter.

BACKGROUND OF THE INVENTION

Self-curable or self-hardenable (hereafter "self-curable") resinous or elastomeric material such as is used for sealants, adhesives and caulking of an article, which is e.g. to be bonded to another by means of the adhesive, is well known in the prior art. By "self-curable" in its strictest sense is meant that the material is cured fully, after having been applied, under the influence of environmental conditions such as moisture available from humid air, or by oxygen in the atmosphere, or by light energy, especially in the ultraviolet range, or by thermal energy, that is, under the influence of elevated temperature, particularly in the absence of auxiliary curing agents to be admixed to the material. The rate of cure as a function of time depends upon the amount of moisture or oxygen, or the amount of thermal or light energy available from the environment. Raising the temperature to accelerate the cure does not require the addition of another accelerator in the self-curable material, but relatively few thermally accelerated materials are reliably controllable. Anyway the curing process may take a considerable period of time, typically few hours or even several days.

A curable material in the sense of this invention includes a self-curable material which upon adding and admixing an additional curing agent in a sufficient amount will cure fully and quickly, such cure requiring only a few minutes or seconds.

For example, a polyester may be mixed with a small amount of an organic peroxide catalyst sufficient to be slowly self-curing at ambient temperature, but benefit from an additional amount of the same or another catalyst and/or accelerator to accelerate the cure. For such self-curable materials, as well as those (such as polyurethanes) which require no curing agent mixed therein (because they are moisture-curable), an accelerator is desirably incorporated just prior to application of the mixture to the article. As will be explained hereinafter in greater detail, the use of a mixture of at least two components, one of which is self-curable, and which mixture is quick-curing, is generally impractical at the present time in production manufacturing equipment, because of the detrimental consequences of having such a mixture cure in the equipment and lines used to apply the mixture.

To add an accelerator separately to accelerate the cure of a self-curable material is not obvious, since the material is already provided with a preselected rate of cure, and therefore would not require an added accelerator. Conventional two-component systems are created to ensure a quick cure in the range from a few (about 10 to 50) seconds to a few (about 1 to 10) minutes, between components which will not cure without being reacted. Even such systems are difficult to use because a mixture of the two components must be used continuously, without an interruption long enough to permit the mixture to cure in the equipment. The difficulty is exacerbated when one component is self-curable without interaction with another, and an accelerator is mixed into the material to accelerate its cure within less than a minute or a few minutes.

The present invention is limited to multi-component systems of the type in which at least one component is self-curable, and at least one other component accelerates the cure of the self-curable material. All references hereafter to a "two-component system" refer to a multi-component system in which at least one component of the mixture to be applied is a self-curable resin or elastomer, and at least one other component is an accelerator. The term "resin" is used to define an organic material which hardens to a rigid form having little, if any, elongation before break at room temperature. The term "elastomer" is used to describe a noticeably flexible, or rubbery material having substantial elongation before break even if it is tough.

To apply such a mixture essentially continuously to an article, the components which are kept separately in storage vessels or containers, are desirably pumped through metering pumps and mixed continuously while flowing through a conduit from which the mixture is applied to the article, coating it as desired. It will be understood that prolonged storage of each of the components is practical, typically in containers into which neither air nor light is admitted, as long as the contents of the containers are kept separate. As soon as the contents are mixed, the mixture begins to cure.

In a continuous operation during which the two components are mixed, and the mixture is uninterruptedly applied to a rapid succession of articles in successive coating operations, quickcuring of the self-curable material to its predetermined substantially fully cured conditions is highly desirable. But, if there is a significant interruption in the application of the mixture, it will cure and plug whichever portion of the equipment in which the mixture remains.

When such an interruption is expected, the mixture may be washed out of the lines and such mixing means and applicator conduit as may be used, with a suitable solvent, until not enough mixture is left in the equipment to cause a problem starting up again. To be sure, interruptions are undesirable but they are unavoidable in many circumstances such as those occasioned by a change in shift or other pauses during working hours, or by an unforeseen disturbance or breakdown of an operation in the overall production system.

The disadvantage of this conventional procedure for immediately cleaning out the equipment is that the solvent used is a wasted expenditure. Moreover, environmental considerations necessitate expensive recovery units, the operation of which, in turn, consumes much energy. A further disadvantage is that a significant loss of valuable material is incurred because it is washed away. They are such disadvantages which are detrimental to profitable operation and should be avoided.

OBJECTS OF THE INVENTION

It is therefore a general object of this invention to accommodate process interruptions by avoiding the economic and operational disadvantages inherent in a two- or multi-component system from which a quick-curing mixture of a self-curable material and an accelerator is dispensed.

It is also an object of the invention to provide a system for carrying out the process of the invention, which system includes first and second and, if appropriate, further supply tanks containing self-curable material and accelerator respectively, and first, second and, if appropriate, further conduit means from said tanks. Said conduit means lead to first and second and, if appropriate, further feeding means controllably connected to a control means for individually adjustably proportioning the flow through each said conduit means to a mixer including an applicator. The system is adapted to feed at the beginning of an application sequence first and second and, if appropriate, further components to said mixing means, whereby accelerator is mixed with the material and the mixture is dispensed from the applicator, and then the flow of accelerator is interrupted so that only self-curable material is dispensed at the end of the sequence.

SUMMARY OF THE INVENTION

The process and system of this invention provides an efficient solution to the problems presented by the use of a two- or multi-component system, and the solution is simple and reliable.

A process and a system for implementing the process has been discovered to mix and apply a mixture of a self curable organic material with an accelerator which will permit the material to cure quickly on an article on which the material is applied, but not cure in the equipment and applicator conduit used to apply the quick-curable mixture.

More specifically, a process is provided for dispensing and applying, sequentially, within an application cycle, through the same applicator means or conduit (hereafter "applicator"), the self-curable material (no accelerator), then the mixture containing accelerator, and finally the self-curable material (no accelerator). Since the same applicator is used, the transition from self-curable material only, to the mixture with accelerator, and back to self-curable material is accompanied with an increase and decrease, respectively, of accelerator in transition zones, connecting zones in which there is no accelerator and a quick-curing zone where there is a predetermined ratio of accelerator to self-curable material.

In the specific instance where immediate adhesion of one article to another is desired, sufficient accelerator is used to provide a quick cure, within few seconds or few minutes, in the quick-curing zone containing the mixture, while the remaining zones containing only self-curable material cure relatively slowly, typically by reaction with moisture in the air, UV-radiation or the like. Thus, sufficient adhesion is obtained to permit further processing of the articles which are adhesively bonded to one another.

The temporary stop of flow accelerator has the effect of gradually diminishing the concentration of the accelerator in the applicator, until only the self-curable material is dispensed to the last section of the article to be coated.

In this connection, it seems appropriate to define the term "application cycle". In its broadest sense, an application cycle starts when one component or a mixture of more than one component is discharged from the applicator and applied to an article, and ends when the discharge of one component, particularly said first self-curing component, is stopped. Explicitly excluded from this definition are short interruptions in the application cycle which may occur when a plurality of articles has to be coated with the material in a continuous sequence. In the following, three typical examples of "application cycles" are further explained:

1. The material is applied to a single article in several sections thereof. Consequently, a plurality of application cycles occurs on this article, either simultaneously or sequentially.

2. The material is applied to a single article in the course of a single application cycle; consequently, there is only one application cycle on this article, starting with the beginning of coating the article and ending as soon as the whole article is coated.

3. The material is applied to several articles in sequence:

Within one application cycle, the material is applied to a plurality of typically small articles, which are arranged tightly adjacent to each other; thereby the material is applied sequentially on each article or simultaneously on all articles.

Withing one application cycle, the material is sequentially applied to a plurality of articles which are arranged, for example, in a row on a assembly line and are sequentially conveyed to the applicator.

It is not expected that any severe disadvantages might occur by proceeding according to the method of the invention. In the case of an article to be bonded to a second article, typically in bonding a glass plate into a frame, the desired immediate bond is ensured by the fact that a considerable area of the article is coated, in the quick-curing section, with the quickcuring mixture. It is thereby warranted that the articles almost immediately can be forwarded to the following process station. In the remaining sections, where only the self-curable component has been applied, a curing of the material will take place as well, although after a certain period of time, under the influence of humidity, of light or of elevated temperature.

In the sense of the foregoing explanations, in practice, the so-called "application cycle" has to be determined within the scope of the present invention, according to the requirements to be fulfilled. It is understood that the definition of the application cycle depends not only on the number of articles to be processed within a given time or sequence; particularly, the required degree of safety has to be considered as well. Two extreme examples shall make clear these considerations, whereby, of course, any solution therebetween may be chosen:

1. It is most likely that unforeseen stops or interruption in a short sequence might occur during the processing of the articles, i.e. during the application of the material to the articles. The effort to insure safety, i.e. the measures to be taken to insure that the apparatus for applying the material to the articles will not be plugged if an unexpected interruption occurs, is very high. In this case, a single application cycle is short, i.e. only one article or only a section of a single article is coated with the material within a single application cycle.

2. It is not to be expected that any interruption in the processing of the articles will occur, or such interruptions may be foreseen in good time. In this case the effort to insure safety is less and several, even hundreds of articles might be coated with the material within one application cycle. With other words, one application cycle is considerably longer than in the previous example and may include a plurality of articles.

Finally it may be appropriate to define the term "uniform" and "non-uniform" in the sense of the present invention, as used in the appended claims. Preparing a "non-uniform" mixture shall mean that the content of the individual components varies with the time, e.g. starting with a low content of a component (1) and a high content of component (2), whereby the amount of (1) is continuously increased and the content of (2) is continuously decreased. On the other hand, preparing a "uniform" mixture shall mean that the contents of (1) and (2) remain constant during the entire mixing period.

Anyhow, the essential background of this invention is to disclose a method of applying a material to an article or a plurality of articles in which it is possible, within a wide bandwidth, to tailor the application process of the material to the article according to the individually present situation with utmost efficiency, thereby avoiding the danger that the application apparatus will be plugged if an unexpected stop occurs.

BRIEF DESCRIPTION OF THE DRAWINGS

The foregoing and other objects and advantages of the present invention will appear more fully from the following description, made in connection with the accompanying drawing of preferred embodiments of the invention, wherein like reference characters refer to the same or similar parts throughout the views and in which:

FIG. 5 is a plan view of a support member carrying six relatively small glass plates to be adhesively bonded in a frame (not shown), to which the adhesive is to be applied successively.

FIG. 6 is a fragmentary plan view of a production line carrying a plurality of glass plates to be adhesively bonded in a frame (not shown), to which the adhesive is to be applied successively.

DETAILED DESCRIPTION OF PREFERRED EMBODIMENTS

Figure 1:
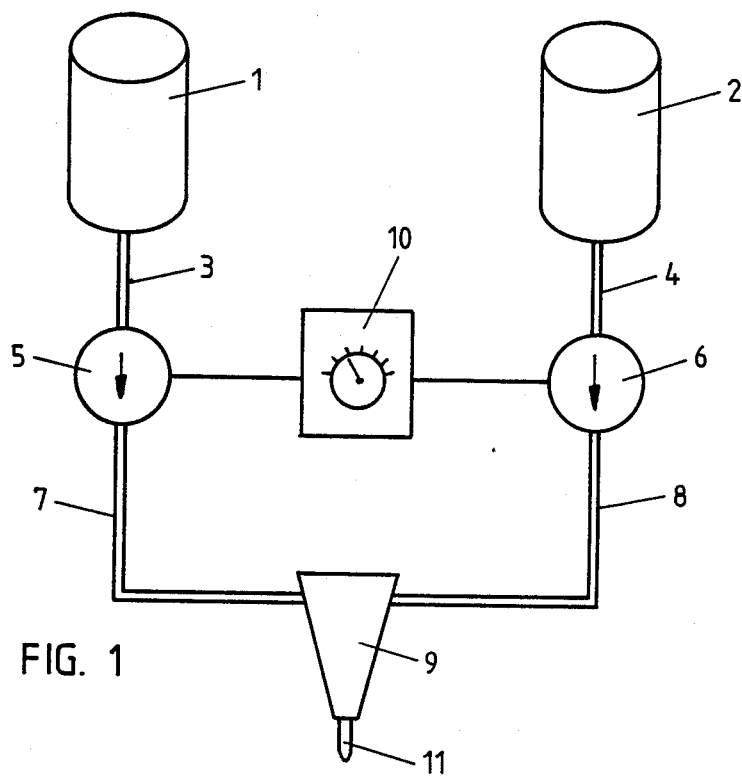
FIG. 1 is a schematic illustration of the essential equipment used to apply an adhesive.

In a particular embodiment of the invention, the system is used to apply a two-component adhesive to the periphery of a plate of glass which is to be adhesively bonded within a frame, and further references to this particular utilization of the invention contemplates glueing, sealing or caulking articles which are to be securely held, relative to one another, in a predetermined position when the adhesive is cured. One of the two components is a self-curable material, for example a moisturecurable polyurethane prepolymer having isocyanate end-groups; the other is an accelerator such as a polyol which will react with the isocyanate end groups. The following detailed description refers to a two-component system because such is commonly used as an adhesive. More than two components may be used, if desired, but at least one component must be self-curable to a final cure within a finite period of time, generally less than 3 days and preferably less than about 8 hours. FIG. 1 schematically illustrates the system using a conventional equipment for applying the two-component adhesive to any article in an arbitrary pattern, on one or more surfaces of the article. The system includes a first supply tank 1 in which one components of the adhesive is stored, i.e. the self-curable material, from which it can flow through line 3 to the suction side of a first metering pump 5. The pump 5 discharges the material through line 7 to a mixer 9, from which it flows into an applicator nozzle 11 onto the article. The article, coated with the self-curable adhesive would then be bonded as desired to another article, and in due time, be fully cured.

In an analogous manner there is provided a second supply tank 2 in which the accelerator is stored which flows through line 4 to the suction side of a second metering pump 6 which discharges the accelerator through line 8 to the mixer 9 from which a mixture of self-curable material and accelerator is applied through the applicator.

The first and second metering pumps 5 and 6 are operatively connected in proportionately controlled fluid communication with a common control means 10 which controls the flow from each pump as a function of time. A conventional control means is used which controls the feed rate of each pump, and therefore determines the proportion of the self-curable material and accelerator delivered to the mixer 9. Generally, the control means is set to deliver a preselected fixed combined amount of self-curable material and accelerator independent of their ratio. In operation, at the start and at the end of an application cycle, no accelerator is pumped to the mixer, while in the intermediate portion of the cycle, a predetermined amount of the first and second components is pumped by pumps 5 and 6 to provide a desired ratio. Depending on the choice of self-curable material, varying amounts by weight of the corresponding accelerators are used, which may be in a range from about 0.1% to about 50% by weight of the mixture in order to to give a very quick cure.

It will be apparent to those skilled in the art that the components of the system as well as the know-how to design and choose such components for a particular operation, are commonly known.

Since the mixture from the system is to be applied to a substrate of arbitrary size and shape in any predetermined zones on any surface thereof, it will be evident that there must be relative movement of the applicator 11 and the article. Typically, the applicator is movable relative to the article, either manually or preferably by a robot arm.

Figure 2:
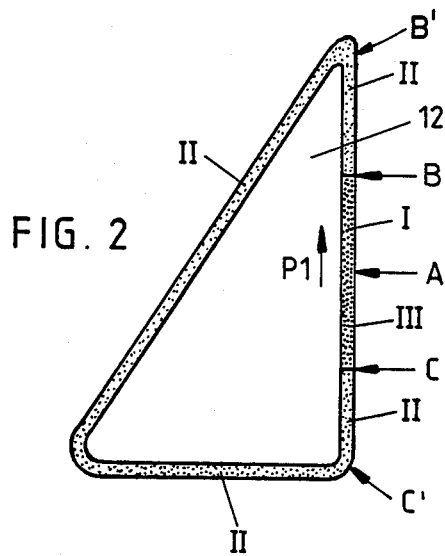
FIG. 2 is a plan view of a relatively small laminar article, such as a triangular glass plate which is to be adhesively bonded along its periphery in a frame (not shown).

FIG. 2 illustrates, as a first example, a relatively small plate 12, such as a triangular plate of glass used for the vent window of an automobile, which plate is to be adhesively held by its periphery in a metal frame (not shown). The plate is to be coated on one side, along its entire periphery, and for a designated width therealong, with a two-component adhesive, then set into the frame adapted to snugly fit the plate. The coating is applied by the process of this invention as follows:

The peripheral zone is regarded as comprising a first section I, a second section II and a third section III, and, as will soon be apparent, only the second section II contains a mixture of self-curable material and accelerator; so the section II is a quick-curing section. The relative extent of the areas covered by the sections is not narrowly critical, but it will be evident that the advantages of the invention will be impaired if the quick-curing section is not as extensive as it can be, or at least the predominant section.

In an idealized implementation of the process, starting from point A, the applicator 11 is positioned thereabove, optionally with the mixer 9 in open fluid communication therewith. The control means 10 is adjusted such that the pump 5 supplies only self-curable material to the applicator 11 which dispenses it as it travels continuously in the direction of the arrow P1. Soon thereafter, when the applicator reaches point B, a mixture of self-curable material and accelerator in a predetermined quick-curing ratio is applied, and this application is continued until at point C which marks the end of section II. At point C only the self-curable material, without accelerator, is applied into section III until the applicator reverts to point A.

Thus, the entire periphery of the plate is coated with adhesive, all of which will cure, but the mixture in section II will cure faster than the accelerator-free material which will selfcure relatively slowly in sections I and III. It is thus assured that the coated plate 12 will be securely held in the frame within the time set for quick-curing the mixture. This set will not be affected by the still-uncured material in sections I and III because these sections are shorter, that is, longitudinally constricted, and will be fully cured, though after a longer time than that required for section II. Typically the cure is effected by humidity in the air, oxygen in the air, UV-light or heat.

It is also assured that there is no accelerator mixed with self-curable material left in the mixing means or the applicator at completion of the application cycle, so that operation of the system may be discontinued, as for example, for a lunch break, or for a change of shift, or even overnight, without having the adhesive set up in the lines or the mixing means.

In the practical implementation of the process, it will be appreciated that, after first applying only self-curable material in section I, flow of the accelerator is initiated at point B by control means 10, so that, as the applicator progresses from point B the amount of accelerator in the mixture in increasing, until when the applicator reaches point B' a predetermined ratio of self-curable material to accelerator is being dispensed. Thus, the initial portion of section II is a first transition zone containing an incremental amount of accelerator which progressively accelerates the rate at which the mixture will cure.

Proceeding from point B' the mixture with a predetermined fixed ratio of accelerator is applied in section II which constitutes a major portion of the periphery, until the applicator arrives at point C' when the flow of accelerator being pumped by pump 6 is discontinued. The mixture being applied after the flow of the accelerator stops, contains a progressively diminishing amount of accelerator so that at point C there is essentially no accelerator, and only self-curable material is applied in section III until the applicator, having continuously traversed the periphery, reverts to point A. Thus, the latter portion of section II is a second transition zone wherein the amount of accelerator is progressively decreasing, and therefore decreases the rate of cure of the mixture.

The points identifying the foregoing zones will be determined by the requirements of the characteristics of the adhesive used and its processing requirements after application. Though, in practice, a transition from unaccelerated material to accelerated mixture will not be instantaneously abrupt, it may be desired to provide, deliberately, a gradual transition in each transition zone, to obtain a desirable quantum of processing flexibility when the rate of cure for the quick-curing material is so high that it will cure in less than 1 minute.

Figure 3:
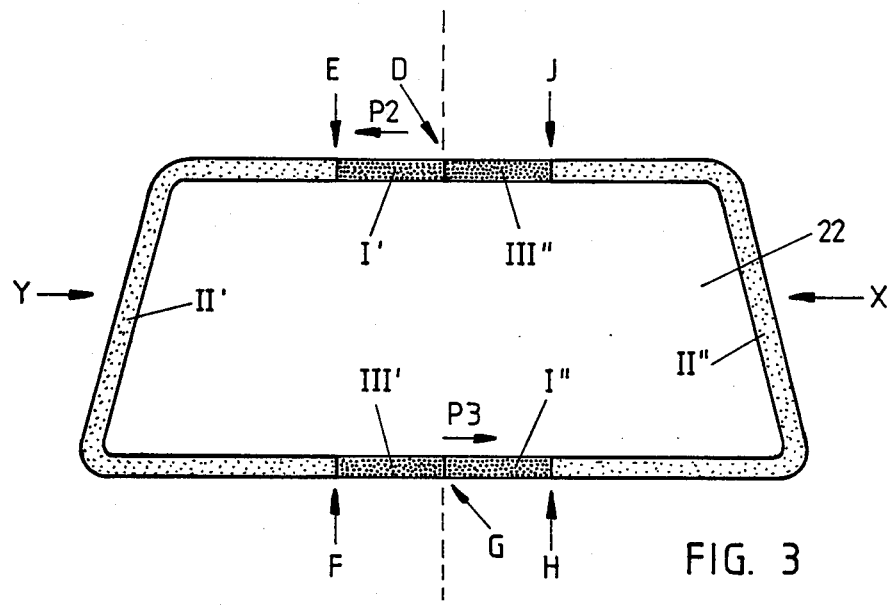
FIG. 3 is a plan view of a relatively large laminar article, such as a trapezoidal glass plate which is to be adhesively bonded in a frame (not shown), utilizing a particular profile of adhesive along the periphery of the plate.

As is illustrated in FIG. 3, a large plate may also be coated with adhesive in a manner analogous to that described hereinabove, or, by repeating the application twice, one application on one zone X of the periphery, and the other on the remaining zone Y. These zones are preferably symmetrically disposed relative to each other for ease of application on a large and heavy object. The coating of adhesive on zone X may be applied first, followed by the coating on zone Y, using the same applicator, or the coatings on each zone may be applied simultaneously by different applicators. These procedures, termed first and second procedures, respectively, are described in greater detail as follows:

Using the single mixing element 9, displaced in the direction of arrow P2 and starting from point D, first, the self-curable material alone is applied in section I', up to point E; then in section II', a mixture of the material and accelerator is applied, up to point F, and then again, only the self-curable material is applied in section III' up to point G. Then, contiguous section I'' is coated up to point H with only self-curable material again, then the next section II'' up the point J with the mixture, and finally, the last section III'' is coated only with self-curable material until the starting point D is reached. In the second procedure which is more economical and time-saving, two applicators are used simultaneously. One starts at point D in the direction of arrow P2 and the other starts at point G in the direction of arrow P3. The application of the adhesive takes place as described before, but the sections I' and I'', II' and II'', and III' and III'' are coated at the same time.

Figure 4:
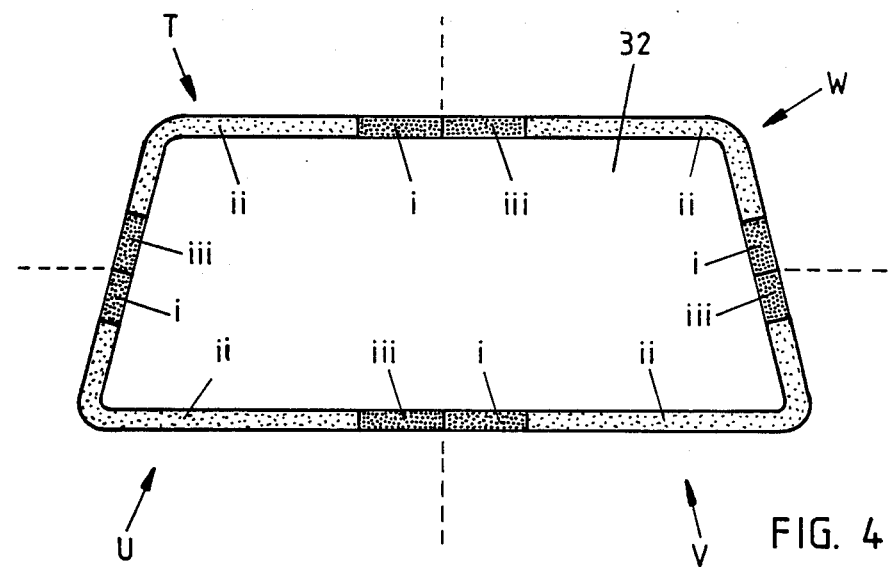
FIG. 4 is a plan view of a relatively large trapezoidal glass plate to be adhesively bonded in a frame (not shown), utilizing a different pattern along its periphery.

An extension of the same concept of application allows even faster and more efficient coating of a particularly large object which may need to be coated on several surfaces each situated in different planes, and where the time of cure justifies the procedure which is illustrated by reference to FIG. 4. The periphery of a large generally trapezoidal plate of glass is divided into zones T, U, V and W. These zones are divided, in each case, into a beginning section i, an intermediate section ii, and an end section iii. As before, the zones, T, U, V and W may be coated sequentially, using one applicator, or simultaneously, using four applicators.

In FIG. 5, there is shown a further example of implementing the process according to the invention:

A plurality of articles, as shown in FIG. 5 the articles 100 to 105, i.e. six articles, are mounted on a common carrier member 99. Each of the articles 100 to 105 has to be coated along a peripheral zone with the material, e.g. a two-component adhesive comprising a self-curable first component and a curing agent as a second component. In known manner, the carrier 99 carrying the articles 100 to 105 is forwarded by suitable means (not shown) to an apparatus for application of the material (also now shown). The method of applying the material is as follows: The application process starts at point A' of the article 100. In the direction of arrow P4, only the first component, the self-curable adhesive, is applied to the article 100 in a first section I*. The remaining section II* of the article 100 is coated with a mixture of the first and the second component of the material; the section II* is thereby a quick-curing section, while the section I* is a slow-curing section. As soon as the applicator (not shown) has reached point A' again, the discharge of the mixture is stopped for a short time and the applicator is displaced to the second article 101. Immediately thereafter, the applicator is operated again in order to coat the entire periphery of the article 101, i.e. the section II* thereof, with the mixture of first and second component. The same operation takes place with the articles 102, 103 and 104 carried on the carrier 99.

As soon as the article 104 has been provided with the material mixture along its entire section II*, the applicator is displaced to point A" of the last article 105 on the carrier 99 and moves the direction of arrow $P_4$ to apply the mixture in the section II* of the article 105. At a certain point, the addition of the second component, the curing accelerator, is stopped, so that in a further section III* on the article 105 only the first component, the self-curing adhesive, is applied, eventually with a gradually decreasing amount of the second component.

In this case the application sequence includes six articles. It is understood that is an example only; likewise it is possible to apply the material to more or less than six articles within a single application cycle. Particularly, if no unexpected interruptions occur and comparatively small articles have to be coated, it is possible to apply the material sequentially to ten, fifty or to hundreds of articles within one definite application cycle.

Specifically in this case, if very small articles have to be handled, it is possible that the first section I* extends over the entire periphery of the first article, eventually also over a part or the entire periphery of the second article and/or the third article. The same is true with reference to the section III*, which might extend over the entire periphery of the last, maybe even over the whole or a part of the periphery of the one or two preceding articles.

Still a further example of implementing the process according to the present invention is schematically shown in FIG. 6. An assembly line 199, only a part thereof being shown in the drawing, is sequentially displaced in the direction of arrow $P_6$. The assembly line 199 carries a plurality of articles, some of them are shown and numbered 200, 201, 202, 203 and 204. All these articles have to be coated along their periphery with the material in an application process according to the invention. Due to operational reasons and considering the fact that a reliable insurance of safety should be provided, the assembly line 199 is virtually divided into sections extending e.g. from M to N in FIG. 6. In the present example, such a section includes three articles 201, 202 and 203. A single operation cycle takes places in each one of these sections. Of course, such a section may include more or less than three articles.

According to the invention, the first article in the section M-N, i.e. the article 201, is coated, in a section I, starting from Point A", with the first, self-curable component of the adhesive only by displacing the applicator (not shown) in the direction of arrow $P_5$. Thereafter the section II is coated with a mixture of the first and the second component until the point A" is reached again. Thereafter, with a short interruption in discharging the mixture, the applicator is displaced to point $A_1"$ of the article 202, whereby the entire peripheral section II is coated with the mixture of the first and the second component. Finally the applicator is displaced to point $A_2"$ of the article 203 onto which the mixture of the first and the second component is applied to the section II by displacing the applicator (not shown) in the direction of arrow $P_5$. Before the point $A_2"$ is reached again, the feeding of the second component, the curing accelerator, is stopped so that in a further section III** only the first component, the self-curing adhesive, or a mixture with a gradually to zero decreasing amount of accelerator is applied. Anyway it is made sure that as soon as point $A_2"$ is reached, only the first component, the slowly self-curing adhesive, is in the apparatus for applying the material.

The steps as just described are repeated in the following operational sequence, starting with the article 204. In the example as hereinbefore described, one definite application cycle includes three articles. It is understood that also in this example more or less than three articles may be coated within one application cycle. It should be pointed out that the short interruption in discharging the material, when the applicator is displaced from one article to the subsequent one, should not be considered as an end of the application cycle, since the duration of such interruption is very short and has no influence whatsoever on the chemical and physical behavior of the mixture, particularly not on an undesired curing of the mixture in the application means.

The adhesive may be chosen from a wide spectrum of two- or multi-component systems, but it is essential, as already stated, that the first component (component A) be self-curable without the addition of the second component (component B), except where component A already contains a sufficient amount of component B for the reaction defined herein to be self-curing.

In the attached Table I are listed, without representing that the list is complete, various known two-component systems which lend themselves for use in this invention. Though the particular use of a two-component system is specifically illustrated hereinabove as being for an adhesive, it will be evident that the same considerations apply to the system's use for a sealant, or other equivalent use.

Moreover, it lies within the scope of the invention that a multi-component system be used, where the "first" component is self-curable as defined herein, and the "second" component consists of two or more ingredients which accelerate the cure of the first component; or, where the first and second components when combined are slowly self-curable, but additional components may be added before application, or during the coating process, to accelerate the cure.

TABLE 1

| Example Nr. | Component A | Component B | Jellying time at RT | |
|---|---|---|---|---|
| | | | A only | A + B |
| 1 | polymercapto compound + alkaline earth peroxide (water-free), curable by humidity, | water containing polymercapto compound | 1 day | 30–60 min |

TABLE 1-continued

| Example Nr. | Component A | Component B | Jellying time at RT A only | A + B |
|---|---|---|---|---|
| | e.g. according to US-PS Nr. 3,912,696 or US-PS Nr. 3,225,017. | | | |
| 2 | polyurethane prepolymer with silane end groups, curable by humidity, e.g. according to US-PS 3,632,557 or US-PS 4,222,925 | mixture of water or polyamine with softening agent | 1 day | 3-10 min |
| 3 | polyurethane prepolymer with isocyanate end groups, curable by humidity, cf. e.g. US-PS 3,779,794 or EP-OS 0,040,469 | water, polyole or polyamine in a softening agent | 1 day | ½-5 min |
| 4 | as in example 3 | polyurethane prepolymer with mercapto, hydroxy, amino or carboxy end groups e.g. according to EP-OS Nr. 0,153,456 | 1 day | 2-40 min |
| 5 | humidity-curable silicon compound, e.g. according to GB-PS 992,366 or DE-PS 1,255,924 | dihydroxypolysiloxanpaste, eventually with water as an accelerator | 1 day | 2-20 min |
| 6 | mixture of an epoxy resin and a polyfunctional ketimine, humidity-curable | diamine- or water-paste | 1 day | ½-2 h |
| 7 | mixture of an epoxy resin and molecular sieve loaded with a polyfunctional amine, humidity-curable | diamine- or water-paste | 1 day | ½-2 h |
| 8 | unsaturated polyester resin with alkaline earth peroxide, waterfree, humidity-curable, cf. US-PS 3,652,521 | peroxyde paste and (separated) cobalt naphthenate | 1 day | 10-30 min |
| 9 | mixture of polyurethane prepolymer with mercapto end groups add an oxidation accelerator, curable by athmospheric oxygen, e.g. according to EP-PS 0,066,167 | peroxide paste | 1 day | 15-45 min |
| 10 | mixture of an epoxy resin and a BF$_3$-amine-complex, heat-curable | BF$_3$-etherate | 1 day (at 100° ca.10 min) | 1-5 min |
| 11 | mixture of an unsaturated polyester resin and organic peroxides heat-curable | Co-naphthenate or sulfinic acids or amines | 1 day (at 100° ca.10 min) | 5-30 min |

What we claim is:

1. A process for applying a curable material including first and second components onto the surface of an article, said first component being curable under ambient conditions after application to the surface of an article and said second component comprising a curing agent which reacts with said first component to accelerate the curing of said first component, wherein said first and second components are selected from the group consisting of: (A) the first component being polymercapto compound and alkaline earth peroxide and the second compound being water containing polymercapto compound; (B) the first component being polyurethane prepolymer with silane end groups and the second component being a mixture of water or polyamine with a softening agent; (C) the first component being polyurethane prepolymer with isocyanate end groups and the second component being water, polyole ore polyamine in a softening agent; (D) the first component being polyurethane prepolymer with isocyanate end groups and the second component being polyurethane prepolymer with mercapto, hydroxy amino or carboxy end groups; (E) the first component being humidity curable silicon compound and the second component being dihydroxypolysiloxan paste; (F) the first compound being a mixture of an epoxy resin and a polyfunctional ketimine and the second component being diamine or water paste; (G) the first component being a mixture of an epoxy resin and molecular sieve loaded with a polyfunctional amine and said second component being diamine or water paste; (H) the first component being unsaturated polyester resin with alkaline earth peroxide and said second component being peroxide paste and (separated) cobalt napthenate; (I) the first component being a mixture of polyurethane prepolymer with mercapto end groups and an oxidation accelerator, and said second component being peroxide paste; (J) the first component being a mixture of an epoxy resin and BF$_3$-amine-complex and said second component being BF$_3$-etherate; and (K) the first component being a mixture of an unsaturated polyester resin and heat curable organic peroxides and said second component being co-napthenate, sulfinic acids or amines; said process consisting of an application cycle having a beginning and an end which cycle comprises the steps of applying a mixture of said first and second components to a predetermined portion of the surface of an article at the beginning of the application cycle, and thence applying during the remaining part of said application cycle only said first component.

2. A process for applying a curable material including first and second components onto the surface of an article with the use of an applicator means, said first component being curable under ambient conditions after application to the surface of an article and said second component comprising a curing agent which reacts with said first component to accelerate the curing of said first component, wherein said first and second components are selected from the group consisting of: (A) the first component being polymercapto compound and alkaline earth peroxide and the second compound being water containing polymercapto compound; (B) the first component being polyurethane prepolymer with silane end groups and the second component being a mixture of water or polyamine with a softening agent; (C) the first component being polyurethane prepolymer with isocyanate end groups and the second component being water, polyole or polyamine in a softening agent; (D) the first component being polyurethane prepolymer with isocyanate end groups and the second component being polyurethane prepolymer with mercapto, hydroxy amino or carboxy end groups; (E) the first component being humidity curable silicon compound and the second component being dihydroxypolysiloxan paste; (F) the first compound being a mixture of an epoxy resin and a polyfunctional ketimine and the second component being diamine or water paste; (G) the first component being a mixture of an epoxy resin and molecular sieve loaded with a polyfunctional amine and said second component being diamine or water paste; (H) the first component being unsaturated polyester resin with alkaline earth peroxide and said second component being peroxide paste and (separated) cobalt naphthenate: (I) the first component being a mixture of polyurethane prepolymer with mercapto end groups and an oxidation accelerator, and said second component being peroxide paste; (J) the first component being a mixture of an epoxy resin and BF$_3$-amine-complex and said second component being BF$_3$-etherate; and (K) the first component being a mixture of an unsaturated polyester resin and heat curable organic peroxides and said second component being co-napthenate, sulfinic acids or amines; said process consisting of an application cycle of said curable material having a beginning and an end comprising the steps of sequentially applying only said first component to the surface of an article by feeding only said first component to said applicator means and depositing it by the applicator means in a first section on an article; applying a mixture of said components by preparing a mixture of said components, feeding said mixture to said applicator means, and depositing said mixture in a second section on said article and thence repeating said step of feeding only said first component to said applicator means and depositing it by the applicator means in a third section on said article, whereby only said first component remains in said applicator means at the end of the application cycle.

3. A process as defined in claim 1, wherein said application cycle includes the step of applying said first component to an article with the use of an applicator means and wherein said step of applying a mixture of said components comprises preparing a mixture of said components, feeding said mixture to said applicator means and depositing said mixture by the applicator means in a first section on an article; and thence feeding only said first component to said applicator means and depositing it in a second section on an article, whereby only said first component remains in said applicator means when the application cycle is completed.

4. A process as defined in claim 2, wherein said steps of applying a mixture of said components, feeding said mixture and depositing said mixture include the steps of preparing a first mixture of said components by first supplying a continuously increasing amount of said curing agent to said applicator means with said first component and depositing said mixture in a first portion of said second section on said article; thence preparing a second substantially constant mixture of said component by supplying a predetermined substantially constant amount of said curing agent to said applicator means with said first component and depositing said mixture in a second portion of said second section on said article; and thence preparing a third mixture of said components by supplying a continuously decreasing amount of said curing agent to said applicator means with said first component and depositing said third mixture in a third portion of said second section on said article; and wherein said step of applying only the first component comprises feeding only said first component to said applicator means and depositing it in said first and third sections on said article, whereby only said first component remains in said applicator at the end of the application cycle.

5. A process for applying a curable material including first and second components onto the surface of an article, said first component being curable under ambient conditions after application to the surface of an article and said second component comprising a curing agent which reacts with said first component to accelerate the curing of said first component, wherein said first and second components are selected from the group consisting of: (A) the first component being polymercapto compound and alkaline earth peroxide and the second compound being water containing polymercapto compound; (B) the first component being polyurethane prepolymer with silane end groups and the second component being a mixture of water or polyamine with a softening agent; (C) the first component being polyurethane prepolymer with isocyanate end groups and the second component being water, polyole or polyamine in a softening agent; (D) the first component being polyurethane prepolymer with isocyanate end groups and the second component being polyurethane prepolymer with mercapto, hydroxy amino or carboxy end groups; (E) the first component being humidity curable silicon compound and the second component being dihydroxypolysiloxan paste; (F) the first compound being a mixture of an epoxy resin and a polyfunctional ketimine and the second component being diamine or water paste; (G) the first component being a mixture of an epoxy resin and molecular sieve loaded with a polyfunctional amine and said second component being diamine or water paste; (H) the first component being unsaturated polyester resin with alkaline earth peroxide and said second component being peroxide paste and (separated) cobalt napthenate; (I) the first component being a mixture of polyurethane pre-polymer with mercapto end groups and an oxidation accelerator, and said second component being peroxide paste; (J) the first component being a mixture of an epoxy resin and $BF_3$-amine-complex and said second component being $BF_3$-etherate; and (K) the first component being a mixture of an unsaturated polyester resin and heat curable organic peroxides and said second component being co-napthenate, sulfinic acids or amines; said process consisting of an application cycle having a beginning and an end, which cycle comprises the steps of applying a mixture of said first and second components to a portion of the surface of an article from the beginning for a predetermined period until shortly before the end of the cycle and thence applying only said first component to the article until the end of the cycle.

6. A process according to claim 1 wherein said application cycle is repeated on one article.

* * * * *